Feb. 23, 1954

T. G. MOORE ET AL 2,670,172

HIGH-PRESSURE VALVE

Filed April 5, 1948

Inventors
ROBERT E. HARVILL
THOMAS G. MOORE
By Herman L. Gordon
ATTORNEY

Feb. 23, 1954  T. G. MOORE ET AL  2,670,172
HIGH-PRESSURE VALVE

Filed April 5, 1948  2 Sheets-Sheet 2

Inventors
ROBERT E. HARVILL
THOMAS G. MOORE
By Herman L. Gordon
ATTORNEY

Patented Feb. 23, 1954

2,670,172

UNITED STATES PATENT OFFICE 2,670,172

HIGH-PRESSURE VALVE

Thomas G. Moore, Takoma Park, and Robert E. Harvill, Hyattsville, Md., assignors to American Instrument Co., Inc., Silver Spring, Md.

Application April 5, 1948, Serial No. 18,994

10 Claims. (Cl. 251—48)

This invention relates to valves, and more particularly to a valve for use with fluids at very high pressures.

A main object of the invention is to provide a novel and improved high pressure valve which is simple in construction, easy to operate, and which is efficiently protected against leakage.

A further object of the invention is to provide an improved high pressure valve of the threaded stem type wherein the thrust load on the stem threads is minimized so that the valve may be operated without damage to the screw threads even at fluid pressures in the neighborhood of 100,000 pounds per square inch, and wherein excessive friction in the valve stuffing box is avoided, so that the valve may be opened or closed without requiring the application of excessive torque to the valve stem.

Further objects and advantages of the invention will become apparent from the following description and claims, and from the accompanying drawings, wherein:

Figure 1:
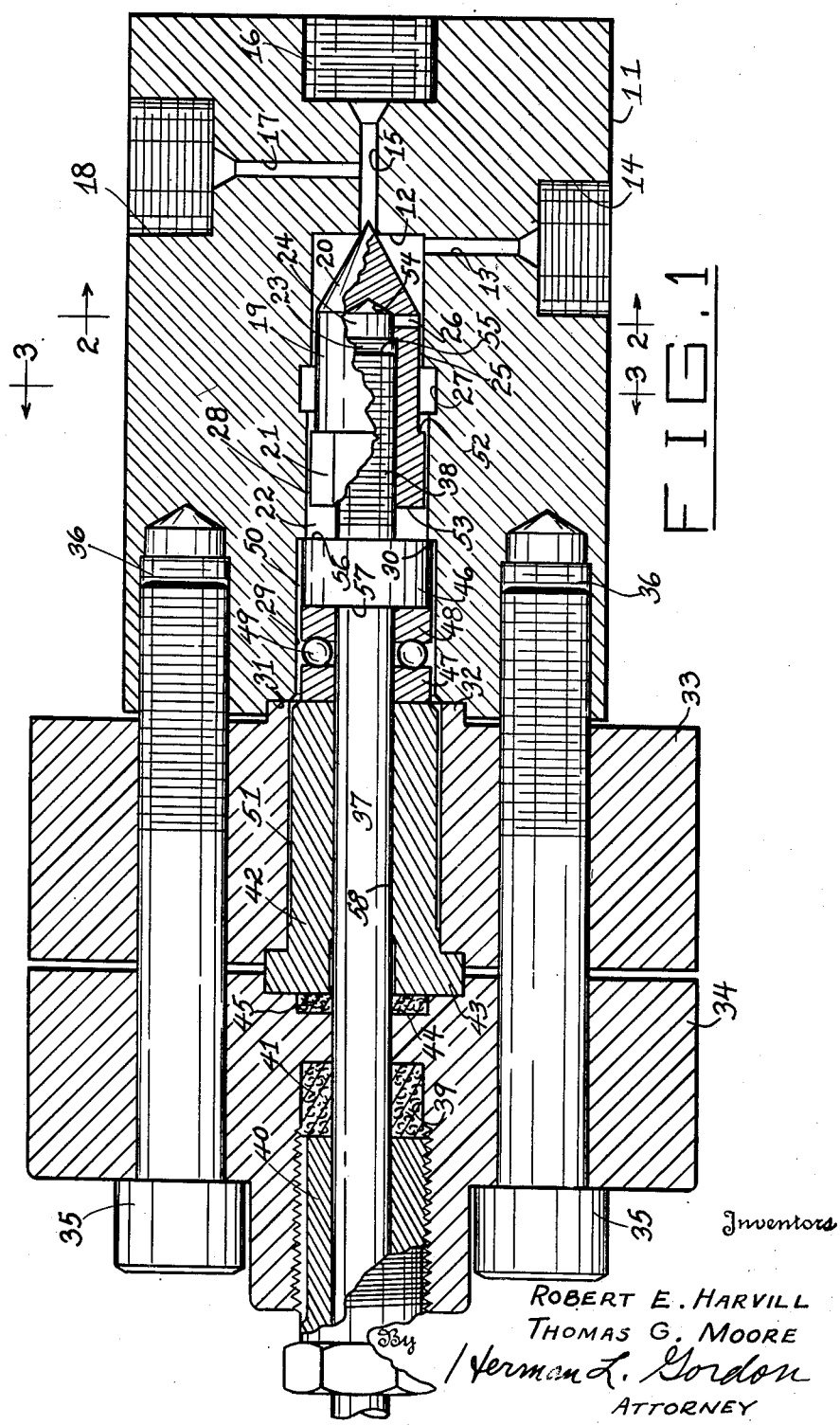
Figure 1 is a longitudinal cross-sectional view taken through a high pressure valve constructed in accordance with the present invention.
Figure 2:
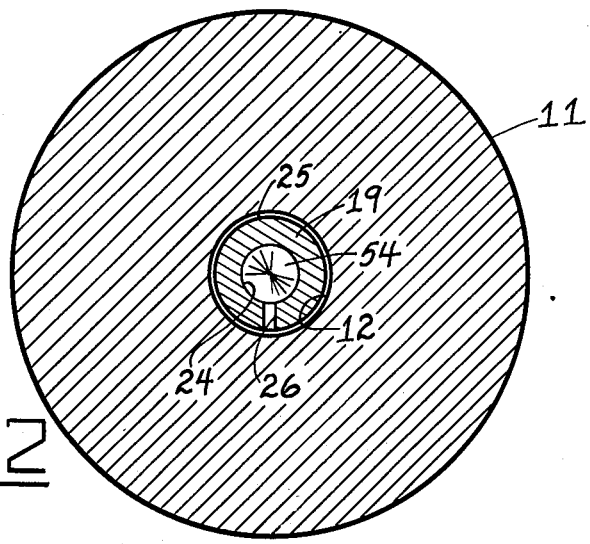
Figure 2 is a transverse cross-sectional view of the valve taken on line 2—2 of Figure 1.
Figure 3:
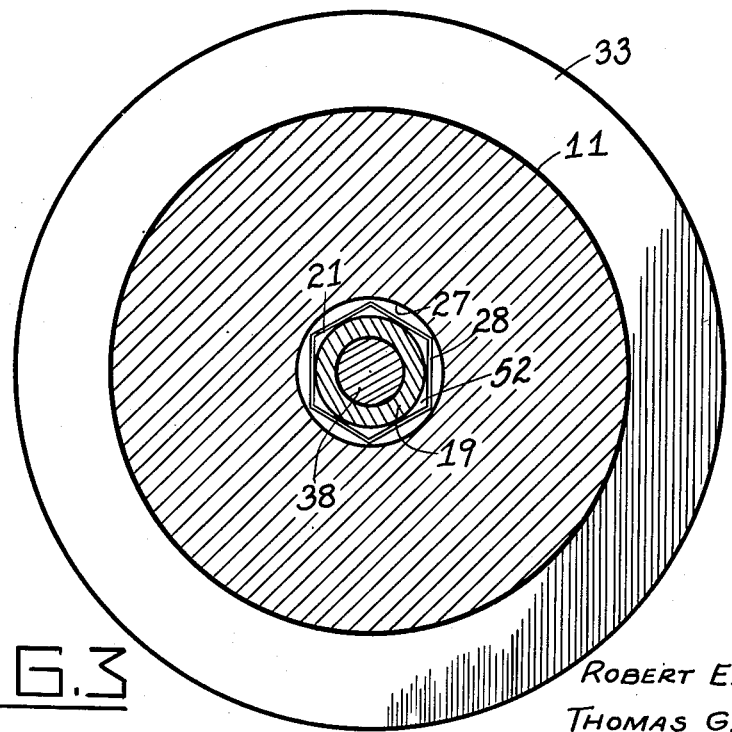
Figure 3 is a transverse cross-sectional view taken on line 3—3 of Figure 1.

In most high pressure valves of the prior art, the valve stem is a threaded member having male screw threads engaged with female screw threads in the valve body or some part of the valve which is fastened to the body. Turning the stem in one direction moves the valve stem away from a seat in the body, to open the valve; turning the stem in the opposite direction moves the stem toward the seat to close the valve.

In such valves, there is a substantial thrust load on the stem, said load being due to the high axial pressure on the inner end of the stem, with only atmospheric pressure acting on the end portion of the stem outside the valve body. The load due to the difference between these pressures ordinarily is transmitted from the valve stem to the valve body by means of the aforesaid screw threads.

There is a definite upper fluid pressure limit for valves of ordinary construction as above described, since at some limiting pressure the thrust load transmitted by the stem screw threads becomes so great that the threads lock and the valve cannot be operated. Forcing the valve by using a lever on the handle or by other means may result in twisting off the stem.

Efforts to improve the operation by changing the stem diameter do not suffice, as the thrust load on the stem threads varies as the square of the stem diameter. Thus, if the stem diameter is increased to make it more resistant to torsion, the thrust load increases as the square of the diameter and the valve still cannot be safely operated due to the increased thrust load.

The strength of the stem in torsion varies as the cube of the diameter. Hence, any effort to decrease the thrust load by decreasing the stem diameter will weaken the stem in torsion at a faster rate than that at which the thrust load is decreased. Therefore it is evident that the solution to the problem lies in some other method of decreasing the thrust load on the stem screw threads. The valve of the present invention represents a solution of the problem, as will be presently shown.

In valves of ordinary construction, there is a stuffing box around the valve stem, this stuffing box serving to confine the fluids being handled to the inside of the valve body while permitting the valve stem to be rotated to open and close the valve. This stuffing box usually is packed with a soft material which is compressed into place by a packing gland. With this construction, the higher the pressure carried by the valve, the more tightly the stuffing box packing must be compressed to prevent leakage.

We have found that at a limiting pressure, the stuffing box packing must be compressed so tightly around the valve stem that the stem is locked. When this happens, the valve cannot be operated. If the stuffing box packing is compressed to a lesser degree, it will not hold the fluids being handled at high pressure, and the stuffing box will leak.

The valve of the present invention is so arranged that it can be operated at pressures in excess of 100,000 pounds per square inch without leakage, at which pressures ordinary valves would not operate. The valve of the present invention is further arranged so that excessive thrust on the valve stem screw threads is avoided, and so that excessive friction in the stuffing box is also avoided.

Referring to the drawings, 11 indicates the valve body, said body being formed with an inner cavity 12 and with a fluid inlet passage 13 communicating with cavity 12. The outer portion of passage 13 communicates with a threaded bore 14 into which a suitable fitting may be screwed, said fitting being connected to the source of fluid under pressure. Communicating with cavity 12 is an axial outlet passage 15 terminating in an internally threaded bore 16 adapted to receive a suitable outlet fitting. Communicating with passage 15 is a lateral outlet passage 17 terminating in an internally threaded bore 18 adapted to receive an additional outlet fitting.

Designated at 19 is a valve plug having a conical tip 20 which is adapted to seat in the inner end of axial passage 15 to close the valve. When tip 20 is thus seated, no fluid can flow through the valve. When tip 20 is moved away from the inner end of passage 15, however, fluid is free to flow from the inlet passage 13 to the outlet passage 15 and out of the valve through the fittings in the threaded bores 16 and 18.

The main body portion of plug 19 is cylindrical. Said body portion terminates in an enlarged hexagonal portion 21. Portion 21 is slidably positioned in a hexagonally shaped axial bore portion 22, whereby the plug 19 may be moved axially but cannot rotate with respect to valve body 11. Plug 19 is formed with an internally threaded axial bore 23 terminating in an unthreaded cavity 24 which is reduced in diameter with respect to the threaded bore portion 23. Clearance is provided between the cylindrical body of plug 19 and the inner wall surface of cavity 12, as shown at 25. A radial passage 26 is formed in plug 19 which establishes communication between cavity 24 and the clearance space 25. Designated at 27 is an annular clearance space of substantial volume formed in the inner wall of cavity 12 adjacent the hexagonal bore portion 22. Designated at 28 is the clearance space between the hexagonal plug portion 21 and the hexagonal bore portion 22.

The hexagonal bore portion 22 terminates at an enlarged cylindrical bore portion 29 coaxial with cavity 12, defining an annular shoulder 30. Bore portion 29 terminates at an annular seat 31 formed in the end of body 11. Closely fitted in annular seat 31 is the annular rim 32 of an intermediate head member 33. Designated at 34 is an outer head member. Passing through outer head member 34 and intermediate head member 33 are relatively heavy socket head cap screws 35, 35 which are threaded into tapped bores 36, 36 formed in body 11, the bolts 35, 35 being parallel to the bore axis of said body.

Designated at 37 is the valve stem, said stem having a threaded end portion 38 which is interengaged with the threaded bore 23. Outer head member 34 is formed with an axial cavity 39 into which is threaded a gland nut 40 through which stem 37 rotatively passes. Positioned in the end of cavity 39 is a quantity of soft packing 41 which is compressed into sealing engagement with stem 37 when gland nut 40 is tightened.

Designated at 42 is a metal sleeve through which stem 37 passes, said sleeve being formed with an annular flange 43 at its end, said flange being seated in opposing annular recesses formed in the inwardly opposing faces of head members 33 and 34. Member 34 is formed with an additional annular recess 44 in which is positioned a quantity of soft packing 45. Packing 45 is compressed into sealing engagement with stem 37 when bolts 35, 35 are tightened during assembly of the valve, the initial volume of the packing prior to assembly being substantially greater than the volume of recess 44.

Stem 37 is formed with a collar 46 which rotatively abuts the annular shoulder 30 at the right side thereof, as viewed in Figure 1. Interposed between the left side of collar 46 and the end of sleeve 42 is a ball bearing assembly comprising the left race 47, the right race 48, and the balls 49 rotatably positioned between said races. As shown at 50, fluid clearance is provided in bore 29 past collar 46 and the ball bearing assembly. A short distance to the right of flange 43, the outer diameter of sleeve 42 is reduced, defining a clearance 51 with respect to the axial bore of head member 33 in which sleeve 42 is positioned. Clearance 51 is of substantial longitudinal extent and communicates with clearance 50.

Fluid under pressure enters cavity 12 through inlet passage 13. The fluid in cavity 12 exerts a thrust load on the tip 20. In addition, fluid under pressure leaks through clearance 25 into cavity 27 and exerts a thrust load in the same direction on the surface of hexagonal portion 21 designated at 52. The thrust loads on tip 20 and area 52 are balanced by the sum of two loads in the opposite direction, as follows: fluid from cavity 12 leaks through clearances 25 and 28 into hexagonal space 22 and exerts a load on the face of portion 21 designated at 53; at the same time, additional fluid leaks through clearance 25 and bleed hole 26 into cavity 24 to exert a load on the end wall of said cavity designated at 54. The sum of the loads on area 53 and wall 54 is equal to the load in the opposite direction on area 52 and tip 20. Thus the loads due to pressure on plug 19 are balanced out and there is no net thrust on said plug.

Tip 20 is removed from or seated on the end rim of passage 15 when valve stem 37 is rotated, the movment of plug 19 being effected by the cooperation of threaded stem portion 38 with the internal threads 23 of the plug. Since there is no net thrust on plug 19, there is no thrust load on the threads of either the valve stem or the plug.

Fluid under pressure which enters cavity 24 through clearance 25 and bleed hole 26 exerts a thrust load on the end of valve stem 37, designated at 55. Likewise, the fluid under pressure entering the hexagonal space 22 through clearance 25 and clearance 28 exerts a thrust load on the right end face of collar 46, designated at 56. Additional fluid leaks through clearance 50 to enter bore 29 and exert a thrust load in the opposite direction on the left end face of collar 46, designated at 57. As the thrust load on area 56 is balanced out by that on area 57, the net thrust load is equal to that imposed on area 55. This thrust load is transmitted to the body 11 through shoulder 57, ball race 48, ball thrust bearings 49, ball race 47, sleeve 42, head member 34, and cap screws 35, 35.

By balancing the thrust on plug 19 and transmitting the thrust on stem 37 to body 11 by means of ball bearings 49, we have succeeded in producing a valve in which the friction due to thrust has been reduced to the point where the valve may be operated at pressures in excess of 100,000 pounds per square inch.

To prevent leakage of fluid around stem 37, sleeve 42 is made with a close fit around the stem at joint 58. Sleeve 42 is centered by intermediate head member 33. The outer surface of the sleeve 42 at clearance space 51 is subjected to the full fluid pressure being handled by the valve. At high pressures, the load on said outer surface of sleeve 42 is sufficient to compress the sleeve 42 around stem 37 and prevent leakage past joint 58. The dimensions of sleeve 42 are such that the sleeve is not compressed to such an extent around stem 37 that excessive friction is created at joint 58. At high pressures, the soft packings 41 and 45 therefore are not relied upon for sealing action, the compression of sleeve 42 being utilized for sealing the valve stem. However, below a limiting value of fluid pressure, sleeve 42 is not compressed sufficiently to prevent leakage at joint 58 and the packings 45 and 41 are employed for this purpose. At low operating pressures, the packing 41 is compressed sufficiently by gland nut 40 to prevent leakage past stem 37 at that point.

As above explained, before assembly of the valve, packing 45 is thicker than the depth of recess 44. Therefore, packing 45 is compressed around stem 37 when head 34 and flange 43 are brought together in the assembly of the valve. To prevent leakage at flange 43, cap screws 35, 35 are screwed down with sufficient force to engage the annular seat in head 34 tightly against flange 43. This force is transmitted through head member 33 to annular rim 32 to provide a tight joint at seat 31.

When the valve is open and under pressure, the thrust loads on plug 19 are balanced as described above. If a pipe line bursts or if a quick-opening valve is used in the pressure system to which this valve is connected, unequal pressures in the valve may cause damage. For example, if the pressure tubing connected to the outlet connection 18 should burst, the pressure in cavity 12 would drop to atmospheric. The pressure in cavity 27 would drop at a rate controlled by the area of clearance 25, the pressure in hexagonal cavity 22 would drop at a rate controlled by the areas of clearances 28 and 25, and the pressure in cavity 24 would drop at a rate controlled by the area of bleed hole 26. If clearances 25 and 28 and bleed hole 26 are small in area, the pressure in cavities 22, 27 and 24 will drop at a rate much slower than that in cavity 12. If the pressure in cavities 22, 27 and 24 drops at a rate slower than that in cavity 12, the pressure in cavity 22 exerts a thrust load on area 53 of plug 19, the pressure in cavity 24 exerts a thrust load on area 54 of plug 19, and the pressure in cavity 27 exerts a smaller thrust load in the opposite direction on area 52 of plug 19. As the effective sum of the areas 53 and 54 is greater than area 52, there may be considerable net thrust on plug 19 which is transmitted to stem 37 by means of the screw threads at 38 and 23. This thrust may be enough to cause stem 37 to fail in tension unless provision is made for its elimination.

By making clearances 25, 28 and bleed hole 26 sufficiently large so as to provide a relief area greater than the area of passage 15, the above undesired condition is avoided. Thus, if the pressure in cavity 12 is suddenly relieved, as through passages 15 and 17 and connection 18, cavities 22, 27 and 24 can be relieved quickly through the large clearance and bleed hole areas provided at 28, 25 and 26.

While a specific embodiment of a high pressure valve has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A high pressure valve comprising a main body formed with a longitudinal cavity, said body being formed with an inlet passage communicating with said cavity and an outlet passage axially aligned with and also communicating with said cavity, a plug member slidably positioned in said cavity and having a tapered tip engageable in the end of said outlet passage, a portion of the plug member being non-circular in cross-section and the cavity having a corresponding non-circular portion cooperating with the plug member to prevent rotation of said plug member, said plug member being formed with an internally threaded axial bore, a head member secured to said body, a compressible sleeve member carried by said head member in axial alignment with said cavity, the rear portion of the sleeve member being in sealing engagement with the head member and having the forward portion of its longitudinal peripheral surface exposed to said cavity, said sleeve member being of substantial thickness at its forward end, a valve stem passing rotatively through said sleeve member and having a threaded end portion threadedly engaging the internal threads of said plug member, a collar carried on said stem, said cavity being formed with an abutment forwardly adjacent said collar and engaged thereby to limit forward movement of the stem into said cavity, and a thrust bearing assembly interposed directly between and engaging said collar and the forward end of said sleeve member to limit rearward movement of the stem.

2. A high pressure valve comprising a main body formed with a longitudinal cavity, said body being formed with an inlet passage communicating with said cavity and an outlet passage axially aligned with and also communicating with said cavity, a plug member slidably positioned in said cavity and having a conically tapered tip engageable in the end of said outlet passage, a portion of the plug member being non-circular in cross-section and the cavity having a corresponding non-circular portion cooperating with the plug member to prevent rotation of said plug member, said plug member being formed with an internally threaded axial bore, a head member secured to the body, a compressible sleeve member carried by said head member in axial alignment with said cavity, said sleeve member being in sealing engagement with the head member at its rear portion and being of substantial thickness at its forward end, a valve stem passing rotatively through said sleeve member and having a threaded end portion threadedly engaging the internal threads of said plug member, a collar carried on said stem, said cavity being formed with an abutment forwardly adjacent said collar and engaged thereby to limit forward movement of the stem into said cavity, and a thrust bearing assembly interposed directly between and engaging said collar and the forward end of said sleeve member to limit rearward movement of the stem, the head member and sleeve member being formed to define an external clearance for the forward portion of the sleeve member extending a substantial distance longitudinally of said sleeve member and communicating with said cavity.

3. A high pressure valve comprising a main body formed with a cavity, said body being formed with a first passage communicating with said cavity and a second passage axially aligned with and also communicating with said cavity, a plug member slidably positioned in said cavity and having side clearance therewith, said plug member being provided with a tapered axial tip engageable in the end of said second passage, cooperating means on the plug member and the body limiting axial rotation of said plug member, said plug member being formed with an internally threaded axial bore, a head member secured to said body, a compressible sleeve member carried by said head member in axial alignment with said cavity, said sleeve member being in sealing engagement with the head member at its rear portion and being of substantial thickness at its forward end, a valve stem passing rotatively through said sleeve member and having a threaded end portion threadedly engaging the internal threads of said plug member, and means engaging said forward end and arranged to limit axial movement of said stem, the head member and sleeve member being formed to define an external clearance for the forward portion of the sleeve member with respect to the head member extending a substantial distance longitudinally of the sleeve member and communicating with said cavity.

4. A high pressure valve comprising a main body formed with a cavity, said body being formed with a first passage communicating with said cavity and a second passage axially aligned with and also communicating with said cavity, a plug member slidably positioned in said cavity and having side clearance therewith, said plug member being provided with a tapered axial tip engageable in the end of said second passage, cooperating means on the plug member and the body limiting axial rotation of said plug member, said plug member being formed with an internally threaded axial bore, a head member secured to said body, a compressible sleeve member carried by said head member in axial alignment with said cavity, said sleeve member being in sealing engagement with the head member at its rear portion and being of substantial thickness at its forward end, a valve stem passing rotatively through said sleeve member and having a threaded end portion threadedly engaging the internal threads of said plug member, means engaging said forward end and arranged to limit axial movement of said stem, the head member and sleeve member being formed to define an external clearance for the forward portion of the sleeve member with respect to the head member extending a substantial distance longitudinally of the sleeve member and communicating with said cavity, and means pressing the rear portion of the sleeve member tightly against the head member.

5. A high pressure valve comprising a main body formed with a cavity, said body being formed with a first passage communicating with said cavity and a second passage axially aligned with and also communicating with said cavity, a plug member slidably positioned in said cavity and having side clearance therewith, said plug member being formed with a tapered axial tip engageable in the end of said second passage, cooperating means on the plug member and the body limiting axial rotation of said plug member, a head member secured to said body, a compressible sleeve member carried by said head member in axial alignment with said cavity, said sleeve member being in sealing engagement with the head member at its rear portion and being of substantial thickness at its forward end, a valve stem passing rotatably through said sleeve member and having an end portion engaging said plug member, means engaging said forward end and arranged to limit axial movement of said stem with respect to said body, the head member and sleeve member being formed to define an external clearance for the forward portion of the sleeve member with respect to the head member extending a substantial distance longitudinally thereof and communicating with said cavity, and means pressing the rear portion of the sleeve member tightly against the head member.

6. A high pressure valve comprising a main body formed with a cavity, said body being formed with a first passage communicating with said cavity, a plug member slidably positioned in said cavity and having side clearance therewith, said body being formed with a second passage axially aligned with and also communicating with said cavity, said plug member being formed with a tapered axial tip engageable in the end of said second passage, cooperating means on the plug member and the body limiting axial rotation of said plug member, a head member secured to said body, a compressible sleeve member carried by said head member in axial alignment with said cavity, said sleeve member being in sealing engagement with the head member at its rear portion and being of substantial thickness at its forward end, a valve stem passing rotatably through said sleeve member and having an end portion engaging said plug member, means engaging said forward end and arranged to limit axial movement of said stem with respect to said body, the head member and sleeve member being formed to define an external clearance for the forward portion of the sleeve member with respect to the head member extending a substantial distance longitudinally thereof and communicating with said cavity, and means pressing the rear portion of the sleeve member tightly against the head member, said rear portion comprising an annular flange, and the head member being formed with an annular seat receiving said flange.

7. A high pressure valve comprising a main body formed with a cavity, said body being formed with a first passage communicating with said cavity and a second passage axially aligned at its inner end with said cavity, a plug member slidably positioned in said cavity and having side clearance therewith, said plug member being formed with a tapered axial tip engageable in the end of said second passage, cooperating means on the plug member and the body limiting axial rotation of said plug member, the cavity being formed with an intermediate groove defining an enlarged clearance space around the intermediate portion of the plug member, a head member secured to said body, a compressible sleeve member carried by said head member in axial alignment with said cavity, said sleeve member being in sealing engagement with the head member at its rear portion and being of substantial thickness at its forward end, a valve stem passing rotatably through said sleeve member and engaging said plug member, means engaging said forward end and arranged to limit axial movement of said stem relative to the body, the head member and the sleeve member being formed to define an external clearance for the forward portion of the sleeve member with respect to the head member extending a substantial distance longitudinally thereof and communicating with the cavity, and means pressing the rear portion of the sleeve member tightly against the head member.

8. A high pressure valve comprising a main body formed with a cavity, said body being formed with a first passage communicating with said cavity and a second passage axially aligned at its inner end with said cavity, a plug member slidably positioned in said cavity and having side clearance therewith, said plug member being formed with a tapered axial tip engageable in the end of said second passage, cooperating means on the plug member and the body limiting axial rotation of said plug member, said plug member being formed with an internally threaded axial bore, a first head member in abutment with said body, a compressible sleeve member carried by said first head member in axial alignment with said cavity, said sleeve member being in sealing engagement with the first head member at its rear portion and being of substantial thickness at its forward end, a second head member, said sleeve member being formed with an annular flange portion seated between the head members, common fastening means passing through said head members and secured to said body, said fastening means exerting axial force on the head members, a valve stem passing rotatively through said second head member and said sleeve member and threadedly engaging the internal threads of said plug member, and means engaging said forward end and arranged to limit axial movement of said stem with respect to said body, the first head member and the sleeve member being formed to define an external clearance for the forward portion of the sleeve member with respect to the first head member extending a substantial distance longitudinally of the sleeve member and communicating with said cavity.

9. A high pressure valve comprising a main body formed with a cavity, said body being formed with a first passage communicating with said cavity and a second passage axially aligned at its inner end with said cavity, a plug member slidably positioned in said cavity and having side clearance therewith, said plug member being formed with a tapered axial tip engageable in the end of said second passage, cooperating means on the plug member and the body limiting axial rotation of said plug member, a first head member in abutment with said body, a relatively rigid sleeve member carried by said first head member, said sleeve member being in sealing engagement with the first head member at its rear portion and being of substantial thickness at its forward end, a second head member, said sleeve member being formed with an annular flange portion seated between the head members, common fastening means passing through said head members and secured to said body, said fastening means exerting axial force on the head members, a valve stem passing rotatively through said second head member and said sleeve member and engaging said plug member, and means engaging said forward end and arranged to limit axial movement of the stem with respect to said body, the first head member and the sleeve member being formed to define an external clearance for the forward portion of the sleeve member with respect to the first head member extending a substantial distance longitudinally of the sleeve member and communicating with said cavity, and said second head member being provided with a packing gland surrounding said valve stem and containing soft packing.

10. A high pressure valve comprising a main body formed with a cavity, said body being formed with a first and second passage communicating with said cavity, a plug member slidably positioned in said cavity and engageable in the end of said second passage, cooperating means on the plug member and the body positively limiting axial rotation of said plug member, said means comprising a non-circular peripheral element on the plug member and a non-circular bore portion formed in said body, said non-circular peripheral element being slidably and non-rotatably received in said non-circular bore portion, a head member secured to said body, a compressible sleeve member carried by said head member in axial alignment with said cavity, said sleeve member being of substantial thickness at its forward end and being in sealing engagement with said head member at its rear portion, a valve stem passing rotatively through said sleeve member and threadedly engaged with said plug member, the head member and sleeve member being formed to define an external clearance for the forward portion of the sleeve member with respect to the head member extending a substantial distance longitudinally of the sleeve member and communicating with said cavity, and means engaging said forward end and arranged to limit axial movement of the stem relative to said body.

THOMAS G. MOORE.
ROBERT E. HARVILL.

References Cited in the file of this patent

UNITED STATES PATENTS

| Number | Name | Date |
|---|---|---|
| 276,379 | Fidler | Apr. 24, 1883 |
| 299,564 | McCabe | June 3, 1884 |
| 691,813 | Saxton | Jan. 28, 1902 |
| 1,348,854 | Eilers | Aug. 10, 1920 |
| 1,462,834 | Stenwall | July 24, 1923 |
| 1,548,018 | Angell | Aug. 4, 1925 |
| 1,980,768 | Specht | Nov. 13, 1934 |
| 2,074,091 | MacKinnon | Mar. 16, 1937 |
| 2,226,273 | Westefeldt | Dec. 24, 1940 |
| 2,350,123 | Mercier | May 30, 1944 |

FOREIGN PATENTS

| Number | Country | Date |
|---|---|---|
| 2,096 | Great Britain | of 1895 |